Figure 1:
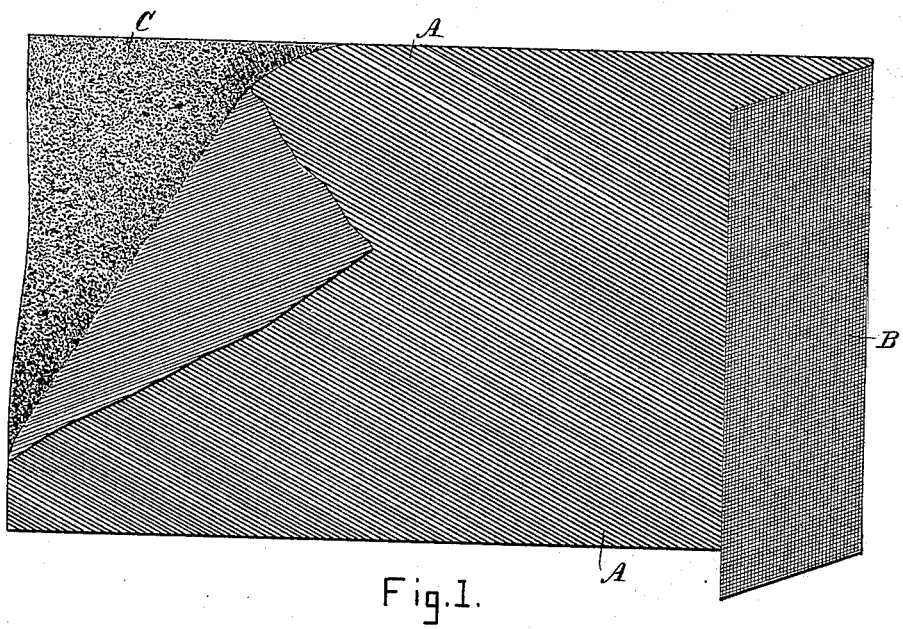

(Specimens.)

F. E. HALL.
WATER PROOF FABRIC.

No. 309,456. Patented Dec. 16, 1884.

Witnesses:
George A. Gardner
E. A. Phelps

Inventor.
Frank E. Hall.

UNITED STATES PATENT OFFICE.

FRANK E. HALL, OF BOSTON, MASSACHUSETTS, ASSIGNOR TO HALL RUBBER COMPANY, OF SAME PLACE.

WATER-PROOF FABRIC.

SPECIFICATION forming part of Letters Patent No. 309,456, dated December 16, 1884.

Application filed December 27, 1883. (Specimens.)

*To all whom it may concern:*

Be it known that I, FRANK E. HALL, a citizen of the United States, residing at Boston, in the county of Suffolk and State of Massachusetts, have invented certain new and useful Improvements in Water-Proof Fabrics; and I do hereby declare that the same are fully described in the following specification and illustrated in the accompanying drawing.

The object of this invention is to produce a composite water-proof fabric having between and intimately united to its two textile surfaces (one of which is formed wholly or in part of interwoven woolen fibers) a thin layer or sheet of rubber not vulcanized by heat or steam, as is usual, but sufficiently cured by the chemical treatment to which the woolen fabric is exposed in the removal of the oils therefrom to cause a thorough adhesion of the rubber.

My invention consists in the improved fabric herein described.

I do not at this time claim the process by which such fabric is produced, as that invention will constitute the subject of another application for Letters Patent to be hereafter filed by me.

My improved fabric is designed for gentlemen's overcoats and ladies' circulars, as a substitute for the ill-looking rubber cloth or gossamer goods heretofore so commonly used, and its adaptability for these uses is due to its lightness and pliability, and to the fact that the most desirable woolen goods may form the exposed surface in the garment, while it is thoroughly water-proof, the interposed layer of rubber, though very thin, not having been made porous and tender or otherwise injuriously affected by vulcanizing, and the outer fabric having a repellent character imparted to it. The inner surface or back of my fabric is preferably of linen or cotton goods, to which the rubber is first applied.

It is well known that rubber does not readily adhere to wool fibers, and this is due to the presence of more or less of the natural oil with such fibers, and of the oils added prior to carding, spinning, and weaving.

It is with difficulty that woven fabrics having any great percentage of wool in their composition can be united by vulcanization to sheets of rubber. I so treat the wool fabric, when about to be applied to the rubber coating of the back, as to give it a repellent character and cover or eliminate all traces of such oil, that the rubber may come into the most intimate union with and adhere permanently to the wool fabric. I have discovered that this treatment also promotes the curing of the rubber and renders unnecessary any vulcanization whatever, the rubber being finally acted on by the eliminating element, thus saving the time and labor otherwise required and effecting a more perfect union.

The drawing illustrates a piece of my improved fabric right side up, and having at one end the front and back separated by tearing open and exposing the rubber layer that had united them, while the other end is turned over to expose the back.

In the carrying out of my invention I take a long piece of fine cotton or linen goods, suitable for the back of the fabric to be produced, and apply upon one of its surfaces a thin coating or film of rubber, placed thereon in the usual plastic or semi-liquid state, and spread evenly by a straight-edge or "knife," allowing but a limited amount of the plastic material to pass when the fabric is drawn beneath it, the same as is practiced in the manufacture of gossamer fabrics. The woolen fabric which is to form the front or right side of the finished goods is then treated with any suitable solvent for the oils which still envelop the wool fibers. For this purpose I prefer to employ a solution of paraffine and naphtha, of which the naphtha element has the effect to remove the oils to a great extent, and the paraffine to cover any traces of oil that remain and render them harmless, to assist in curing the rubber, at the same time acting as a repellent to make the goods more thoroughly water-proof with so light a film of rubber as I employ.

It is obvious that if, by the treatment referred to, the woolen fabric is given a repellent character, a much lighter film of rubber will suffice than would be required to render it equally water-proof if not thus made repellent. In uniting them the webs are unrolled and pass superposed between two calender-rollers, that surface of the woolen web to which the solvent has been applied coming next to the rubber film on the other web.

The solvent may be applied to the woolen fabric by a revolving roller dipping in the liquid and pressing against said fabric; or the fabric may pass through a bath of the solvent.

I claim as my invention—

A composite fabric having an interior film of rubber uniting its two textile surfaces, one of said surfaces being a cotton or linen fabric, while the other is composed wholly or largely of interwoven woolen fibers made repellent of water by treatment with paraffine and naphtha or equivalent solution, substantially as and for the purposes set forth.

In testimony whereof I hereto affix my signature in presence of two witnesses.

FRANK E. HALL.

Witnesses:
   GEO. A. GARDNER,
   E. A. PHELPS.